US008440755B2

(12) United States Patent
Qin et al.

(10) Patent No.: US 8,440,755 B2
(45) Date of Patent: May 14, 2013

(54) METHOD OF MAKING HYDROXYARYL-FUNCTIONALIZED INTERPOLYMER

(75) Inventors: Zengquan Qin, Copley, OH (US); Yuan-Yong Yan, Copley, OH (US); Xiao-Dong Pan, Akron, OH (US)

(73) Assignee: Bridgestone Corporation, Tokyo (JP)

( * ) Notice: Subject to any disclaimer, the term of this patent is extended or adjusted under 35 U.S.C. 154(b) by 307 days.

(21) Appl. No.: 12/828,494

(22) Filed: Jul. 1, 2010

(65) Prior Publication Data

US 2011/0028632 A1    Feb. 3, 2011

Related U.S. Application Data

(60) Provisional application No. 61/222,310, filed on Jul. 1, 2009, provisional application No. 61/222,477, filed on Jul. 1, 2009.

(51) Int. Cl.
C08K 3/22 (2006.01)
A61K 9/16 (2006.01)

(52) U.S. Cl.
USPC .......................................... 524/430; 524/543

(58) Field of Classification Search .................... 524/430
See application file for complete search history.

(56) References Cited

U.S. PATENT DOCUMENTS

| | | | |
|---|---|---|---|
| 2,356,128 A | 8/1944 | Thomas et al. | |
| 4,181,545 A | 1/1980 | Anderson | |
| 4,182,803 A | 1/1980 | Kanagawa et al. | |
| 4,321,343 A | 3/1982 | Rooney | |
| 4,499,243 A * | 2/1985 | Rader ........................ | 525/333.1 |
| 4,550,142 A | 10/1985 | Akita et al. | |
| 4,975,491 A | 12/1990 | Quirk | |
| 5,017,652 A | 5/1991 | Abe et al. | |
| 5,081,191 A | 1/1992 | Quirk | |
| 5,153,291 A | 10/1992 | Leitz et al. | |
| 5,310,811 A | 5/1994 | Cottman et al. | |
| 5,336,726 A | 8/1994 | DuBois | |
| 5,455,307 A | 10/1995 | Terry et al. | |
| 5,523,337 A | 6/1996 | Banerjee et al. | |
| 5,674,798 A | 10/1997 | Kitamura et al. | |
| 5,695,747 A | 12/1997 | Forestier et al. | |
| 5,780,551 A | 7/1998 | Engel et al. | |
| 5,872,167 A | 2/1999 | Wideman et al. | |
| 6,242,522 B1 | 6/2001 | Ezawa et al. | |
| 6,265,490 B1 | 7/2001 | Morel-Fourrier et al. | |
| 6,699,935 B2 | 3/2004 | Akema et al. | |
| 6,703,470 B2 | 3/2004 | Konno et al. | |
| 6,838,539 B2 * | 1/2005 | Hogan et al. .................. | 526/347 |
| 6,992,147 B1 | 1/2006 | Ozawa et al. | |
| 7,056,985 B2 | 6/2006 | Faust et al. | |
| 7,208,171 B2 | 4/2007 | Messersmith et al. | |
| 7,226,979 B2 * | 6/2007 | Faust et al. .................... | 525/298 |
| 7,279,527 B2 | 10/2007 | Harwood et al. | |
| 7,342,070 B2 | 3/2008 | Tsukimawashi et al. | |
| 7,405,262 B2 | 7/2008 | Antkowiak et al. | |
| 7,618,937 B2 | 11/2009 | Messersmith et al. | |
| 7,723,440 B2 | 5/2010 | Hogan et al. | |
| 7,858,679 B2 | 12/2010 | Messersmith et al. | |
| 7,868,110 B2 | 1/2011 | Yan | |
| 7,897,665 B2 | 3/2011 | Kameda et al. | |
| 2003/0087338 A1 | 5/2003 | Messersmith et al. | |
| 2003/0216522 A1 | 11/2003 | Oshima et al. | |
| 2005/0288398 A1 | 12/2005 | Messersmith et al. | |
| 2008/0149566 A1 | 6/2008 | Messersmith et al. | |
| 2008/0171012 A1 | 7/2008 | Messersmith et al. | |
| 2010/0286348 A1 * | 11/2010 | Pan et al. ..................... | 526/84 |
| 2010/0330025 A1 | 12/2010 | Messersmith et al. | |
| 2011/0028632 A1 | 2/2011 | Qin et al. | |
| 2012/0059113 A1 | 3/2012 | Pan et al. | |
| 2012/0130009 A1 | 5/2012 | Qin et al. | |
| 2012/0136091 A1 | 5/2012 | Yan et al. | |
| 2012/0136113 A1 | 5/2012 | Yan et al. | |
| 2012/0136128 A1 | 5/2012 | Yan et al. | |

FOREIGN PATENT DOCUMENTS

| | | |
|---|---|---|
| EP | 0 442 068 A2 | 12/1990 |
| EP | 0 455 191 A2 | 11/1991 |
| JP | 49-41116 | 11/1974 |
| JP | H05-230126 | 9/1993 |
| JP | H07-258476 | 10/1995 |
| JP | 2007-211054 | 8/2007 |
| WO | WO 2011/106765 A2 | 9/2011 |
| WO | WO 2011/153109 A2 | 12/2011 |

OTHER PUBLICATIONS

G. Westwood et al., "Simplified Polymer Mimics of Cross-Linking Adhesive Proteins," *Macromolecules*, May 4, 2007, pp. 3960-3964, 2007, 40 (American Chemical Society; Washington, D.C.).

S. Ganguly et al., "Effect of surface modification of carbon black of 1,2-dihydroxy benzene and 1,2,3-trihydroxy benzene on a natural rubber-carbon black composite," *Indian J. Chem. Technol.*, 2005, pp. 695-700, vol. 12, No. 6 (Council of Scientific & Industrial Research; New Delhi, India)—abstract only.

A. Banerjee, "Novel approach of rubber-filler interaction through surface modification of carbon black," version of article that appeared in Apr. 2003 *Rubber World Magazine*—article downloaded from thefreelibrary.com.

A. Hirao et al., "Polymerization of Monomers Containing Functional Groups Protected by Trialkylsilyl Groups, 1-Synthesis of Poly(4-vinylphenol) by Means of Anionic Living Polymerization," *Makromol. Chem., Rapid Commun.*, 1982, 3, pp. 941-946.

K. Jankova, "Synthesis by ATRP of poly(ethylene-*co*-butylene)-*block*-polystyrene, poly(ethylene-*co*-butylene)-*block*-poly(4-acetoxystyrene) and its hydrolysis product poly(ethylene-*co*-butylene)-*block*-poly(hydroxystyrene)," *Macromol. Rapid Commun.*, 1999, 20, pp. 219-223 (Wiley-VCH Verlag GmbH; Weinheim, Germany).

(Continued)

*Primary Examiner* — Hui Chin

(74) *Attorney, Agent, or Firm* — Meredith E. Hooker; David G. Burleson

(57) ABSTRACT

Cationic techniques can be used to polymerize monomers that include a class of hydroxyaryl compounds so as to provide polymers that exhibit desirable properties including, but not limited to, reduced hysteresis. Compositions such as vulcanizates in which such polymers can be utilized and products such as tire components that incorporate and/or are manufactured from such compositions also are provided.

12 Claims, No Drawings

OTHER PUBLICATIONS

K Satoh et al., "Direct Living Cationic Polymerization of p-Hydroxystyrene with Boron Trifluoride Etherate in the Presence of Water," Macromolecules, Jul. 8, 2000, pp. 5405-5410, 2000, 33 (American Chemical Society; Washington, D.C.).

A. Hirao et al., "Recent advance in living anionic polymerization of functionalized styrene derivatives," *Prog. Polym. Sci.*, 2002, vol. 27, pp. 1399-1471 (Elsevier Science Ltd.; London, UK).

H. Lee et al., "Single-molecule mechanics of mussel adhesion," *PNAS*, 2006, vol. 103, No. 35, pp. 12999-13003 (The National Academy of Sciences of the USA; Washington, DC).

K. Satoh et al., "A Linear Lignin Analogue: Phenolic Alternating Copolymers from Naturally Occuring-Methylstyrene via Aqueous-Controlled Cationic Copolymerization," *J. Am. Chem. Soc.*, 2007, 129, pp. 9586-9587 (American Chemical Society; Washington, DC).

H. Lee et al., "A reversible wet/dry adhesive inspired by mussels and geckos," *Nature*, Jul. 19, 2007, vol. 448, pp. 338-342 (Nature Publishing Group; New York, NY).

R. Quirk et al., "Anionic synthesis of chain-end functionalized polymers using 1,1-diphenylethylene derivatives. Preparation of 4-hydroxylphenyl-terminated polystyrenes," *Makromol. Chem*., 1989, 190, pp. 487-493.

R. Quirk et al., "Recent Advances in the Anionic Synthesis of Chain-End Functionalized Polymers," *Macromol. Symp.*, 2003, 195, pp. 69-74 (WILEY-VCH Verlag GmbH & KGaA; Weinheim, Germany).

M. Yu et al., "Role of L-3,4-Dihydroxyphenylalanine in Mussel Adhesive Proteins," *J. Am. Chem. Soc.*, 1999, 121, pp. 5825-5826 (American Chemical Society; Washington, DC).

D.M. Weisberg et al., "Synthesis and Characterization of Amphiphilic Poly(urethaneurea)-*comb*-polyisobutylene Copolymers," *Macromolecules*, 2000, 33, pp. 4380-4389 (American Chemical Society; Washington, DC).

* cited by examiner

METHOD OF MAKING HYDROXYARYL-FUNCTIONALIZED INTERPOLYMER

CROSS-REFERENCE TO RELATED APPLICATIONS

This application claims priority to and the benefit of U.S. provisional patent appl. Nos. 61/222,310 and 61/222,477, both filed Jul. 1, 2009, the entire disclosures of which are incorporated herein by reference.

BACKGROUND INFORMATION

Good traction and resistance to abrasion are primary considerations for tire treads; however, motor vehicle fuel efficiency concerns argue for a minimization in their rolling resistance, which correlates with a reduction in hysteresis and heat build-up during operation of the tire. These considerations are, to a great extent, competing and somewhat contradictory: treads made from compositions designed to provide good road traction usually exhibit increased rolling resistance and vice versa. Tread compositions typically contain one or more elastomers and one or more types of reinforcing materials such as particulate carbon black and silica; see, e.g., *The Vanderbilt Rubber Handbook*, 13th ed. (1990), pp. 603-04.

Filler(s), polymer(s), and additives typically are chosen so as to provide an acceptable compromise or balance of the desired properties. Ensuring that reinforcing filler(s) are well dispersed throughout the elastomeric material(s) both enhances processability and acts to improve physical properties. Dispersion of filler particles can be improved by increasing their interaction with the elastomer(s) and/or decreasing their interaction with each other. Examples of efforts of this type include high temperature mixing in the presence of selectively reactive promoters, surface oxidation of compounding materials, surface grafting, and chemically modifying the polymer, typically at a terminus thereof.

Terminal chemical modification often occurs by reaction of a living (i.e., anionically initiated) polymer with a functional terminating agent. Some of the numerous examples of this approach include U.S. Pat. Nos. 3,109,871, 4,647,625, 4,677,153, 5,109,907, 6,977,281, etc., as well as references cited therein and later publications citing these patents.

A recent approach has involved functionalization with a compound that includes an aryl group that includes multiple hydroxyl functionalities (see WO 2009/086490), which has the advantage of providing excellent interactivity with a variety of particulate fillers. This approach also has shown evidence of providing vulcanizates that exhibit good traction properties, even in wet conditions. The functionalized polymers at issue there are said to be capable of preparation via emulsion techniques, often involving free radical initiators, and solution techniques. Within the latter category, anionic initiation and coordination catalysis are described as possible propagation techniques.

Certain types of monomers can be difficult or impossible to polymerize by the foregoing propagation mechanisms. One such monomer is isobutylene.

Tire components like inner liners often employ polyisobutylene (PIB) and copolymers of isobutylene and isoprene (IIR), as well as halogenated versions of the latter. Because of the inability to effectively polymerize isobutylene by anionic or coordination techniques, these types of polymers typically are made by cationic addition polymerizations.

SUMMARY

Vulcanizates with desirable properties can be obtained from compounds employing polymers that include hydroxyl group-containing aryl functionalities. Such polymers enhance interactivity with both conventional and non-conventional fillers.

Provided herein is a method of providing polymers that include mer derived from one or members of a group of hydroxyaryl compounds. The method involves cationic initiation of a plurality of monomers. The monomers to be polymerized can include one or more vinyl monomers that include at least one with an aryl group having at least one directly bonded —OR moiety where R is a hydrolyzable protecting group.

The method can include an additional reaction step in which each protecting group is hydrolyzed so as to provide aryl group(s) that have at least one directly bonded hydroxyl group. This additional step can involve reaction of the carbocationic polymer with a terminating compound(s), although typically a separate de-protection step is employed.

This process can result in a polymer that includes multiple A mer units, which include ethylenic unsaturation, and at least one B mer unit that includes a pendent aryl group having one or more directly bonded hydroxyl groups (after hydrolysis of the R moieties); other types of mer optionally can be included as well. Where more than one B mer is included in the resulting polymer, the B mer typically are contiguous, i.e., form a block. If a block of B units is present, it can be relatively close to a terminus of the polymer, i.e., no more than six, four or two polymer chain atoms from a terminal unit. Selective introduction of the monomer(s) from which the B mer are derived can control the position(s) of the resulting B mer along the polymer chain. For example, one or more B units can be incorporated into the polymer after polymerization of the other monomers has been accomplished, optionally followed by quenching or reaction with a compound that can provide additional functionality to the polymer.

One such polymer that can be prepared is one that includes isoprene mer and a relatively small amount of B mer (with "relatively small" being numerically defined below).

Methods of using this these types of polymers, compositions such as vulcanizates in which they can be utilized, and products such as tire components that incorporate and/or are manufactured from such compositions also are provided.

In certain embodiments, the monomers to be polymerized can include polyene(s), some or all of which can be conjugated dienes.

The polymer can take any of a variety of architectures including substantially linear, branched, star-shaped, etc. It can include as a terminal moiety the radical of a functionalizing compound, one example of which is a compound that includes at least one aryl group having one or more —OR moieties.

Regardless of architecture or degree of randomness, these types of polymers have been found to exhibit excellent interactivity with a wide variety of particulate fillers including carbon black and silica as well as non-conventional fillers such as inorganic oxides and hydroxides, clays and the like. Dispersion of such fillers can positively impact performance properties, including impermeability, of vulcanizates provided from such filled compositions.

Other aspects of the present invention will be apparent to the ordinarily skilled artisan from the description that follows. To assist in understanding that description, certain definitions are provided immediately below, and these are intended to apply hereinthroughout unless the surrounding text explicitly indicates a contrary intention:

"polymer" means the polymerization product of one or more monomers and is inclusive of homo-, co-, ter-, tetra-polymers, etc.;

"mer" or "mer unit" means that portion of a polymer derived from a single reactant molecule (e.g., ethylene mer has the general formula —CH$_2$CH$_2$—);

"copolymer" means a polymer that includes mer units derived from two reactants, typically monomers, and is inclusive of random, block, segmented, graft, etc., copolymers;

"interpolymer" means a polymer that includes mer units derived from at least two reactants, typically monomers, and is inclusive of copolymers, terpolymers, tetrapolymers, and the like;

"random interpolymer" means an interpolymer having mer units derived from each type of constituent monomer incorporated in an essentially non-repeating manner and being substantially free of blocks, i.e., segments of three or more of the same mer;

"substituted" means one containing a heteroatom or functionality (e.g., hydrocarbyl group) that does not interfere with the intended purpose of the group in question;

"directly bonded" means covalently attached with no intervening atoms or groups;

"polyene" means a molecule with at least two double bonds located in the longest portion or chain thereof, and specifically is inclusive of dienes, trienes, and the like;

"polydiene" means a polymer that includes mer units from one or more dienes;

"phr" means parts by weight (pbw) per 100 pbw rubber;

"radical" means the portion of a molecule that remains after reacting with another molecule, regardless of whether any atoms are gained or lost as a result of the reaction;

"aryl group" means a phenyl group or a polycyclic aromatic radical;

"protecting group" means a group that (1) is sufficiently reactive toward the oxygen atom of a hydroxyl functionality that, under a first set of reaction conditions, it can replace the H atom of that group, (2) is non-reactive toward carbanionic polymers and the initiators used to provide them, and, optionally, (3) can be replaced by a H atom under a second set of reaction conditions which differ from the first set;

"gum Mooney viscosity" is the Mooney viscosity of an uncured polymer prior to addition of any filler(s);

"compound Mooney viscosity" is the Mooney viscosity of a composition that includes, inter alia, an uncured or partially cured polymer and particulate filler(s);

"terminus" means an end of a polymeric chain; and

"terminal moiety" means a group or functionality located at a terminus.

DESCRIPTION OF ILLUSTRATIVE EMBODIMENTS

As apparent from the foregoing Summary, the method can involve any of a variety of possible permutations or combinations thereof, and the resulting polymer can be characterized in a variety of ways. Generally, the polymer includes vinyl mer and one or more of the aforedescribed B mer units. In at least certain embodiments, the polymer also can include directly bonded pendent aromatic groups.

The following describes the production and use of a polymer that includes at least one B mer, i.e., a unit that includes a pendent aryl, preferably phenyl, group with at least one directly bonded OR group. Where more than one B mer unit is present, they can constitute a block of the polymer; in some embodiments, a block of B units can be within ten, eight, six, four, or even two polymer chain atoms from a terminus of the polymer. In some of the described embodiments, the resulting polymer includes multiple A mer, i.e., alkene units (some or all of which can be derived from one or more types of dienes, particularly one or more types of conjugated dienes, e.g., 1,3-butadiene). Each of the A and B mer can result from incorporation of ethylenically unsaturated monomers. In addition or alternatively, the polymer can include mer from other types of ethylenically unsaturated monomers, e.g., other types of vinyl monomers.

The A mer typically result from incorporation of $C_4$-$C_{18}$, commonly $C_4$-$C_{16}$ and more commonly $C_4$-$C_8$ alkenes such as isobutylene, 2-methyl-1-butene, 3-methyl-1-butene, 2-methyl-2-butene, 4-methyl-1-pentene, beta-pinene, and the like; $C_4$-$C_{14}$ polyenes, particularly isoprene (typically in minor amounts relative to the other types of alkenes); divinyl ether; and N-vinylcarbazole or any of a variety of substituted variants thereof.

Exemplary interpolymers include those in which two or more of the foregoing types of ethylenically unsaturated hydrocarbons are used to provide A units. Regardless of how many types of ethylenically unsaturated hydrocarbons are incorporated, one or more B units also are included. In block interpolymers, the B units can be incorporated before or after the A units. In the case of the latter (B after A), the type of end-capping technique described in U.S. Pat. No. 7,226,979 might be beneficial, optionally as modified to employ an —OR group-substituted diphenylethylene-type compound such as is described in WO 2011/002830.

B units include a pendent aryl group which includes one or more directly bonded hydroxyl groups. Because the H atoms of hydroxyl groups are active and can interfere with certain polymerization processes, the one or more B units typically are provided from compounds that include R groups, i.e., groups that are non-reactive in the types of conditions utilized when polymerizing ethylenically unsaturated monomers but which later can be removed, typically by hydrolysis or similar reaction, so as to provide the desired hydroxyl groups. The particular type(s) of protecting group(s) employed should not interfere with the polymerization process, and the de-protection process employed to provide hydroxyl groups should not destroy or otherwise react with ethylenic unsaturation in the polymer resulting from the presence of A units. A non-limiting class of useful protecting groups is trialkylsiloxy groups, which can be provided by reacting hydroxyl groups with a trialkylsilyl halide. While the following examples employ tert-butyldimethylsiloxy groups, others such as acetal, tert-butyl ether, 2-methoxyethoxy ether, and the like also can be used.

The number of OR groups on the aryl, typically phenyl, group of each B unit need not be the same, where the number is the same, the OR groups need not be at the same position(s) on those rings. Using a phenyl group as a representative aryl group, relative to the point of attachment of the phenyl group to the polymer chain, a single OR group can be located ortho, meta, or para on the phenyl ring, while multiple OR groups can be provided 2,3-, 2,4-, 2,5-, 2,6-, 3,4-, 3,5-, 3,6-, 2,3,4-, 2,3,5-, etc., on the phenyl ring. Exemplary of the foregoing are protected versions of 2-hydroxystyrene, 3-hydroxystyrene, 4-hydroxystyrene, 2,3-dihydroxy-styrene, 2,4-dihydroxystryene, and 3,4-dihydroxystryene, many of which advantageously are soluble in the types of organic solvents set forth below.

B units typically are provided from vinyl aromatic compounds that include one or more hydroxyl-producing groups directly attached to their aryl, typically phenyl, rings. Such compounds can be represented by the general formula

where $R^1$ is an aryl group, specifically a phenyl group or two or more fused aromatic rings, that includes n OR groups with $1 \leq n \leq 5$ and each R independently being the type of protecting group described above. (Although each R need not be identical, ease and simplicity typically result in a single type of R moiety being used in a given compound.) The OR groups can be substituents of the same ring of $R^1$ or can be substituents of different rings and, where $R^1$ contains three or more OR groups, two of them can be substituents of one ring with the other(s) being substituent(s) of other ring(s). In one embodiment, two OR groups can be at the 3 and 4 positions of the same ring within the aryl group, preferably a phenyl group. Where $R^1$ is other than a phenyl group and includes more than one OR group and where the OR groups are on more than one ring, at least two of the OR groups preferably are least somewhat proximate, i.e., directly bonded to ring C atoms that are separated by no more than 4, preferably 3, and even more preferably 2, other ring atoms.

When one or more formula I-type compounds is polymerized, it/they provide the B unit(s), after which each of the R moieties can be hydrolyzed so as to provide phenolic hydroxyl groups.

The number of B units typically is small relative to the number of other units; a relatively small number of B units has been found to provide a satisfactory level of desired properties, with further improvements in those properties not necessarily being proportional to the number of B units present. This relatively small number can be expressed in a number of ways. For example, the weight percentage of the final polymer attributable to B units commonly is less than 2%, more commonly from ~0.1 to ~1.5%, and typically from ~0.2 to ~1.0%. The percentage of B mer relative to the total number of mer in the polymer commonly is less than 10%, more commonly no more than 8%, even more commonly no more than 5%, still more commonly no more than 3%, even still more commonly no more than 2%, yet still more commonly no more than 1%, more commonly from ~0.01 to ~0.75%, and typically from ~0.05 to ~0.5%. The total number of B units in a given polymer generally is from 1 to several dozen, commonly from 1 to 12, more commonly from 1 to 10, and most commonly from 1 to 5.

The B units can be separated from one another or, more typically, two or more B units can be contiguous along the polymer chain. (While the ordinarily skilled artisan understands how to synthesize random and block interpolymers, each is discussed in some detail below.) Further, the B units can incorporated near the beginning of the polymerization, near the end of the polymerization, or at any one or more intermediate points; in the first two of the fore-going possibilities, a B unit can be provided within 6 chain atoms of, within 2 units of, adjacent to a terminus of the polymer, or as a terminal unit, either alone or as part of a block.

Where the B units are desired to be located preferentially at one or more points along the polymer chain, the introduction of one or more compounds as represented by formula I can be staged relative to the other types of monomers. Where the other types of monomers are essentially depleted (i.e., polymerized), staged delivery of the formula I-type compounds can result in a block of B units which, if no additional monomers are charged to the polymerization vessel, can result in a terminal B block. Alternatively, the polymerization can be started with only formula I-type compounds present so as to form an initial block of B units followed by addition of other types of monomers designed to provide other types of units, either in a random or block manner.

Both emulsion and solution polymerizations are commonly employed to make elastomers, but the latter affords greater control with respect to such properties as randomness, microstructure, etc. Solution polymerizations have been performed since about the mid-20th century, so the general aspects thereof are known to the ordinarily skilled artisan; nevertheless, certain aspects are provided here for convenience of reference. The following representative description of a solution polymerization is based on a batch process, although extending this description to, e.g., semi-batch or continuous processes is within the capability of the ordinarily skilled artisan.

Both polar solvents, such as THF, and non-polar solvents can be employed in anionic polymerization techniques, with the latter type being more common in industrial practice. Examples of non-polar solvents include various $C_5$-$C_{12}$ cyclic and acyclic alkanes as well as their alkylated derivatives, and certain liquid aromatic compounds (e.g., toluene, benzene, xylene, etc.). Halogenated alkanes such as chloromethane, chloroethane, methylene chloride, 1,1-dichloroethane, chloroform, 1,2-dichloroethane, etc., also can be useful. Mixtures of any two or more of the foregoing also can be used. Additionally, small amounts of other solvents such as ethyl acetate, nitroethane, and the like also can be present. The ordinarily skilled artisan is aware of other useful solvent options and combinations.

Any of the catalysts and catalyst systems capable of catalyzing cationic polymerizations are believed to be useful in the present process. For example, any of a variety of strong protonic acids, typically involving a unreactive counteranion (e.g., $H_2SO_4$, $HClO_4$, etc.) or Lewis acids can be used. Non-limiting examples of the latter include $BCl_3$, $BF_3$, $AlCl_3$, $SnCl_4$, $TiCl_4$, $VCl_5$, $FeCl_3$, as well as organoaluminum compounds such as chlorodiethylaluminum and dichloroethylaluminum; see also U.S. Pat. Publ. No. 2007/0238843 for a description of certain potentially useful zinc halide initiators. Minute amounts of water or a strong acid (e.g., HCl) sometimes are added to activate certain types of Lewis acid catalysts.

Also potentially useful are combinations of initiators and Lewis acid co-initiators such as are described in the aforementioned U.S. Pat. No. 7,226,979. Suitable initiators include organic ethers, organic esters, and organic halides. Initiators may be mono-, di- or tri-functional and so forth, thereby producing, for example, diblock, triblock, and radial-shaped block copolymers, respectively. Specific examples of these initiators include alkyl cumyl ethers, cumyl halides, alkyl cumyl esters, cumyl hydroxyl compounds and hindered versions of the same, for instance, 2-chloro-2,4,4-trimethylpentane, cumyl chloride, dicumyl chloride, 5-tert-butyl, 1,3-dicumyl chloride (i.e., 5-tert-butyl-1,3-bis(1-chloro-1-methylethyl)benzene), and tricumyl chloride (i.e., 1,3,5-tris(1-chloro-1-methylethyl)benzene). Compounds useful as a co-initiator are the same Lewis acids set forth above.

An anhydrous, anaerobic solution of polymerization solvent(s) and some or all of the monomer(s) commonly is provided at a temperature of from about −100° to ~0° C., more commonly from about −90° to about −50° C. The solvent and monomers can be treated so as to minimize or remove all materials capable of poisoning the catalyst. A proton scavenger, typically a Lewis base, also can be included to ensure the virtual absence of protic impurities, such as water, which can lead to polymeric contaminants in the final product. Examples of proton scavengers include sterically hindered pyridines, for example, substituted or unsubstituted 2,6-di-tert-butylpyridines, such as 2,6-di-tert-butylpyridine and 4-methyl-2,6-di-tert-butylpyridine, as well as 2,6-dimethylpyridine, 1,8-bis(dimethylamino)-naphthalene and diisopropylethyl amine. Such materials, when used, typically are present at a concentration of from 1 to 10 times that of protic impurities in the polymerization system.

The catalyst can be present at the time that the monomers are introduced or at any point thereafter.

Polymerization can be conducted at any of a wide range of pressures, although the polymerization typically is conducted under a pressure at which all of the monomers can be maintained in the liquid phase. Higher pressures can be utilized as needed or desired, typically by pressurizing the reactor with a gas that is inert to the polymerization reaction.

The solution can be agitated, and the reaction allowed to proceed for a period of time sufficient to result in the formation of the desired polymer, usually from ~0.001 to ~0.5 hours, commonly from ~0.005 to ~0.25 hours, and typically from ~0.01 to ~0.1 hours. For general information on cationic polymerizations, the interested reader is directed to a more complete description from any of a variety of sources such as, e.g., U.S. Pat. No. 2,356,128.

Polymers that include one or more B units, regardless of whether randomly distributed or provided as a block, have been found to have improved cold flow properties relative to similar polymers not containing B units. The level of improvement generally scales with the number of B units present, although the correlation is not necessarily linear and is impacted by the position (e.g., near a chain end versus mid-chain) and the proximity (e.g., random versus block) of the B units.

After a desired degree of conversion has been reached, a quenching agent can be added and, if the reaction vessel is to be reserved solely for polymerizations, the reaction mixture can be removed to a post-polymerization vessel for further reaction(s). At this point, the reaction mixture commonly is referred to as a "polymer cement" because of its relatively high concentration of polymer.

The polymer is considered to include functionality from the B units. This functionality can be present throughout the polymer chain or can be concentrated at one or more points along the chains by formation of B blocks. In one embodiment, a B block can be provided at a terminus of a polymer chain by delaying the addition of formula I-type compound(s) until after polymerization of other types of monomers is essentially complete and then terminating the polymerization (as described below).

Polymers made according to cationic techniques generally have a number average molecular weight ($M_n$) of up to ~200,000 Daltons. In certain embodiments, the $M_n$ can be as low as ~2000 Daltons; in these and/or other embodiments, the $M_n$ advantageously can be at least ~10,000 Daltons or can range from ~15,000 to ~100,000 Daltons or from ~20,000 to ~75,000 Daltons. Often, the $M_n$ is such that a quenched sample exhibits a gum Mooney viscosity ($ML_4/100°$ C.) of from ~2 to ~150, more commonly from ~2.5 to ~125, even more commonly from ~5 to ~100, and most commonly from ~10 to ~75.

During polymerization and any optional post-polymerization functionalization, the anhydrous, anaerobic conditions typically present in the polymerization vessel are such that essentially all R moieties remain. Ensuring that most, if not all, of these are converted to H atoms typically is desirable to enhance interactivity between the functionalized polymer and particulate filler (when the polymer is used in filled compositions). While functionalizing reaction conditions (or the conditions involved in quenching and processing, described below) might be sufficient to hydrolyze some of the $R^2$ groups, a separate hydrolysis reaction designed to ensure complete conversion to H atoms can be utilized. The ordinarily skilled artisan is aware of a variety of potentially useful hydrolyzing reactions, although one exemplary route is set forth below in the examples.

Solvent can be removed from the quenched polymer cement by conventional techniques such as drum drying, extruder drying, vacuum drying or the like, which may be combined with coagulation with water, alcohol or steam, thermal desolvation, etc.; if coagulation is performed, oven drying may be desirable.

During the foregoing processing and/or the compounding described below, some of the hydroxyl groups created by de-protection of the B units might undergo further reaction, e.g., with other functional groups present in the compound.

The resulting polymer can be utilized in an inner liner compound or can be blended with any conventionally employed rubbers including natural rubber and/or non-functionalized synthetic rubbers such as, e.g., one or more of homo- and interpolymers that include just polyene-derived mer units (e.g., poly(butadiene), poly(isoprene), and copolymers incorporating butadiene, isoprene, and the like), SBR, butyl rubber, neoprene, EPR, EPDM, acrylonitrile/butadiene rubber (NBR), silicone rubber, fluoroelastomers, ethylene/acrylic rubber, EVA, epichlorohydrin rubbers, chlorinated polyethylene rubbers, chlorosulfonated polyethylene rubbers, hydrogenated nitrile rubber, tetrafluoroethylene/propylene rubber and the like. When a functionalized polymer(s) is blended with conventional rubber(s), the amounts can vary from ~5 to ~99% of the total rubber, with the conventional rubber(s) making up the balance of the total rubber. The minimum amount depends to a significant extent on the degree of hysteresis reduction desired.

Amorphous silica ($SiO_2$) can be utilized as a filler. Silicas are generally classified as wet-process, hydrated silicas because they are produced by a chemical reaction in water, from which they are precipitated as ultrafine, spherical particles. These primary particles strongly associate into aggregates, which in turn combine less strongly into agglomerates. "Highly dispersible silica" is any silica having a very substantial ability to de-agglomerate and to disperse in an elastomeric matrix, which can be observed by thin section microscopy.

Surface area gives a reliable measure of the reinforcing character of different silicas; the Brunauer, Emmet and Teller ("BET") method (described in *J. Am. Chem. Soc.*, vol. 60, p. 309 et seq.) is a recognized method for determining surface area. BET surface area of silicas generally is less than 450 $m^2/g$, and useful ranges of surface include from ~32 to ~400 $m^2/g$, ~100 to ~250 $m^2/g$, and ~150 to ~220 $m^2/g$.

The pH of the silica filler is generally from ~5 to ~7 or slightly over, preferably from ~5.5 to ~6.8.

Some commercially available silicas which may be used include Hi-Sil™ 215, Hi-Sil™ 233, and Hi-Sil™ 190 (PPG Industries, Inc.; Pittsburgh, Pa.). Other suppliers of commercially available silica include Grace Davison (Baltimore, Md.), Degussa Corp. (Parsippany, N.J.), Rhodia Silica Systems (Cranbury, N.J.), and J.M. Huber Corp. (Edison, N.J.).

Silica can be employed in the amount of ~1 to ~100 phr, preferably in an amount from ~5 to ~80 phr. The useful upper range is limited by the high viscosity that such fillers can impart.

Other useful fillers include all forms of carbon black including, but not limited to, furnace black, channel blacks and lamp blacks. More specifically, examples of the carbon blacks include super abrasion furnace blacks, high abrasion furnace blacks, fast extrusion furnace blacks, fine furnace blacks, intermediate super abrasion furnace blacks, semi-reinforcing furnace blacks, medium processing channel blacks, hard processing channel blacks, conducting channel blacks, and acetylene blacks; mixtures of two or more of these can be used. Carbon blacks having a surface area (EMSA) of at least 20 $m^2/g$, preferably at least ~35 $m^2/g$, are preferred; surface area values can be determined by ASTM D-1765 using the CTAB technique. The carbon blacks may be in pelletized form or an unpelletized flocculent mass, although unpelletized carbon black can be preferred for use in certain mixers.

The amount of carbon black can be up to ~50 phr, with ~5 to ~40 phr being typical. When carbon black is used with silica, the amount of silica can be decreased to as low as ~1 phr; as the amount of silica decreases, lesser amounts of the processing aids, plus silane if any, can be employed.

Elastomeric compounds typically are filled to a volume fraction, which is the total volume of filler(s) added divided by the total volume of the elastomeric stock, of ~25%; accordingly, typical (combined) amounts of reinforcing fillers, i.e., silica and carbon black, is ~30 to 100 phr.

When silica is employed, a coupling agent such as a silane often is added so as to ensure good mixing in, and interaction with, the elastomer(s). Generally, the amount of silane that is added ranges between ~4 and 20%, based on the weight of silica filler present in the elastomeric compound. Coupling agents can have a general formula of A-T-G, in which A represents a functional group capable of bonding physically and/or chemically with a group on the surface of the silica filler (e.g., surface silanol groups); T represents a hydrocarbon group linkage; and G represents a functional group capable of bonding with the elastomer (e.g., via a sulfur-containing linkage). Such coupling agents include organosilanes, in particular polysulfurized alkoxysilanes (see, e.g., U.S. Pat. Nos. 3,873,489, 3,978,103, 3,997,581, 4,002,594, 5,580,919, 5,583,245, 5,663,396, 5,684,171, 5,684,172, 5,696,197, etc.) or polyorganosiloxanes bearing the G and A functionalities mentioned above. Addition of a processing aid can be used to reduce the amount of silane employed. See, e.g., U.S. Pat. No. 6,525,118 for a description of fatty acid esters of sugars used as processing aids. Additional fillers useful as processing aids include, but are not limited to, mineral fillers, such as clay (hydrous aluminum silicate), talc (hydrous magnesium silicate), and mica as well as non-mineral fillers such as urea and sodium sulfate. Exemplary micas contain principally alumina, silica and potash, although other variants can be used. Additional fillers can be utilized in an amount of up to ~40 phr, typically up to ~20 phr.

Silica commonly is employed in amounts up to ~100 phr, typically in an amount from ~5 to ~80 phr. When carbon black also is present, the amount of silica can be decreased to as low as ~1 phr; as the amount of silica decreases, lesser amounts of the processing aids, plus silane if any, can be employed.

One or more non-conventional fillers having relatively high interfacial free energies, i.e., surface free energy in water values ($\gamma_{pl}$) preferably are used in conjunction with or in place of carbon black and/or silica. The term "relatively high" can be defined or characterized in a variety of ways such as, e.g., greater than that of the water-air interface, preferably several multiples (e.g., at least 2×, at least 3× or even at least 4×) of this value; at least several multiples (e.g., at least 3×, at least 5×, at least 7×, or even at least 10×) of the $\gamma_{pl}$ value for amorphous silica; in absolute terms such as, e.g., at least ~500, at least ~750, at least ~1000, at least ~1500, and at least ~2000 $mJ/m^2$; and in ranges such as, e.g., from ~350 to ~4000 $mJ/m^2$, from ~400 to ~5000 $mJ/m^2$, from ~450 to ~4000 $mJ/m^2$, from ~500 to ~5000 $mJ/m^2$, as well as various sub-ranges.

Non-limiting examples of naturally occurring materials with relatively high interfacial free energies include various metal oxides and metal hydroxide. Specific non-limiting examples include F-apatite, goethite, hematite, zincite, tenorite, gibbsite, quartz, kaolinite, all forms of pyrite, and the like. Certain synthetic complex oxides also can exhibit this type of high interfacial free energy.

The foregoing types of materials typically are more dense than either carbon black or amorphous silica; thus, replacing a particular mass of carbon black or silica with an equal mass of a non-conventional filler typically will result in a much smaller volume of overall filler being present in a given compound. Accordingly, replacement typically is made on an equal volume, as opposed to equal weight, basis. (This weight inequality issue might be able to be overcome or ameliorated by employing non-standard particles such as, e.g., hollow particles of one or more types of non-conventional fillers as well as relatively lighter particles coated so as to have a surface that includes one or more of types of non-conventional filler compounds.) Generally, ~10 to ~58% of the conventional particulate filler material(s) can be replaced with an approximately equivalent (~0.85× to ~1.15×) volume of other filler particles is sufficient; in other embodiments, ~15 to ~55% of the conventional particulate filler material(s) can be replaced with an approximately equivalent (~0.9× to ~1.1×) volume of other filler particles; in still other embodiments, replacing ~18 to ~53% of the conventional particulate filler material(s) with an approximately equivalent (~0.95× to ~1.05×) volume of other filler particles can be preferable.

The non-conventional filler particles generally can be of approximately the same size as the conventional fillers employed in compounds. In other words, neither extremely large particles such as those employed in the aforementioned U.S. Pat. No. 5,066,702 nor extremely small particles such as those employed in the aforementioned U.S. Pat. No. 6,972, 307 are required. In general, particles with relatively small diameters are preferred both for reinforcement purposes and to ensure a large number of particles are available at the tread surface.

Addition of a processing aid can be used to reduce the amount of silane employed. See, e.g., U.S. Pat. No. 6,525,118 for a description of fatty acid esters of sugars used as processing aids. Additional fillers useful as processing aids include, but are not limited to, mineral fillers, such as clay (hydrous aluminum silicate), talc (hydrous magnesium silicate), and mica as well as non-mineral fillers such as urea and sodium sulfate. Preferred micas contain principally alumina, silica and potash, although other variants are also useful. The additional fillers can be utilized in an amount of up to ~40 phr, typically up to ~20 phr.

Other conventional rubber additives also can be added. These include, for example, process oils, plasticizers, antidegradants such as antioxidants and antiozonants, curing agents and the like.

All of the ingredients can be mixed using standard equipment such as, e.g., Banbury or Brabender mixers. Typically, mixing occurs in two or more stages. During the first stage (often referred to as the masterbatch stage), mixing typically is begun at temperatures of ~120° to ~130° C. and increases until a so-called drop temperature, typically ~165° C., is reached.

Where a formulation includes silica, a separate re-mill stage often is employed for separate addition of the silane component(s). This stage often is performed at temperatures similar to, although often slightly lower than, those employed in the masterbatch stage, i.e., ramping from ~90° C. to a drop temperature of ~150° C.

Reinforced rubber compounds conventionally are cured with ~0.2 to ~5 phr of one or more vulcanizing agents such as, for example, sulfur or peroxide-based curing systems. For a general disclosure of suitable vulcanizing agents, the interested reader is directed to an overview such as that provided in Kirk-Othmer, *Encyclopedia of Chem. Tech.*, 3d ed., (Wiley Interscience, New York, 1982), vol. 20, pp. 365-468. Vulcanizing agents, accelerators, etc., are added at a final mixing stage. To ensure that onset of vulcanization does not occur prematurely, this mixing step often is done at lower temperatures, e.g., starting at ~60° to ~65° C. and not going higher than ~105° to ~110° C.

Vulcanizates prepared from reinforced rubber compounds of the type just described can be used for a variety of purposes including, inter alia, as an inner liners for inflated articles such as tires and sporting equipment (e.g., air filled balls).

The relevant teachings of all patent documents mentioned above are incorporated herein by reference.

That which is claimed is:

1. A method of providing a rubber composition, said method comprising cationically initiating polymerization of a plurality of monomers, said plurality of monomers comprising at least one vinyl monomer and at least one monomer that comprises an aryl group having at least one directly bonded —OR moiety where R is a protecting group, thereby providing a polymer that comprises multiple A mer and less than 10 mole percent B mer, wherein at least some of said A mer comprise ethylenic unsaturation and each of said B mer comprises an aryl group having at least one directly bonded —OR moiety where R is a protecting group; recovering said polymer; and blending said polymer with particulate filler that comprises at least one of carbon black and silica so as to provide said rubber composition.

2. The method of claim 1 wherein said plurality of monomers comprises at least one of an alkene, a vinyl ether, and an N-vinylcarbazole.

3. The method of claim 1 wherein at least some of said A mer that comprise ethylenic unsaturation are derived from conjugated diene.

4. The method of claim 1 wherein said polymer comprises no more than 5 mole percent B mer.

5. The method of claim 1 wherein said polymer comprises no more than 3 mole percent B mer.

6. The method of claim 1 wherein said polymer comprises no more than 1 mole percent B mer.

7. The method of claim 1 further comprising hydrolyzing said R protecting group so as to provide a polymer that comprises multiple A mer and at least three B' mer, wherein each of said B' mer comprises an aryl group having at least one directly bonded hydroxyl moiety.

8. The method of claim 1 further comprising vulcanizing said rubber composition so as to provide a vulcanizate.

9. The method of claim 1 wherein said particulate filler further comprises at least one of a metal oxide, metal hydroxide and clay.

10. The method of claim 9 further comprising vulcanizing said rubber composition so as to provide a vulcanizate.

11. The method of claim 10 further comprising building a tire that comprises said vulcanizate as a component.

12. The method of claim 8 further comprising building a tire that comprises said vulcanizate as a component.

* * * * *